United States Patent [19]

Stamper

[11] Patent Number: 4,900,608
[45] Date of Patent: Feb. 13, 1990

[54] FLEXIBLE EPOXY-COATED FABRIC

[75] Inventor: Richard W. Stamper, Lambertville, Mich.

[73] Assignee: GenCorp Inc., Fairlawn, Ohio

[21] Appl. No.: 177,200

[22] Filed: Apr. 4, 1988

[51] Int. Cl.⁴ .................. B32B 7/12; B32B 27/08; B32B 27/12; B32B 27/38; B32B 33/00

[52] U.S. Cl. .................. 428/151; 427/386; 427/412; 428/224; 428/241; 428/242; 428/246; 428/248; 428/252; 428/253; 428/262; 428/264; 428/265; 428/267; 428/283; 428/286; 428/287; 428/290; 428/341; 428/342; 428/413; 428/414

[58] Field of Search .............. 427/386, 412; 428/151, 428/224, 246, 248, 252, 253, 262, 264, 265, 267, 286, 287, 290, 341, 342

[56] References Cited

U.S. PATENT DOCUMENTS 3,184,332  5/1965  Rachinsky .
3,591,400  7/1971  Palmquist et al. .
3,934,067  1/1976  Goldman et al. .
4,219,598  8/1980  Norma et al. .
4,310,593  1/1982  Gross .
4,329,387  5/1982  Goodrich .
4,537,834  8/1985  Achar et al. .
4,623,574 11/1986  Harpell et al. .

Primary Examiner—James C. Cannon

[57] ABSTRACT

A flexible epoxy coated fabric has good hand, good wear resistance, good hydrolytic resistance, and good ultraviolet light resistance. An optional but desirable binder is a true coating and not an impregnation of the fabric in that at least 50 percent of the binder material resides on the surface of the fabric. A flexible epoxy material is utilized as a coating and generally has an intermediate hydrocarbon portion having at least 25 carbon atoms for each chain. The fabric is suitable as a substitute for leather in clothing, and upholstery as in automotive upholstery.

21 Claims, 1 Drawing Sheet

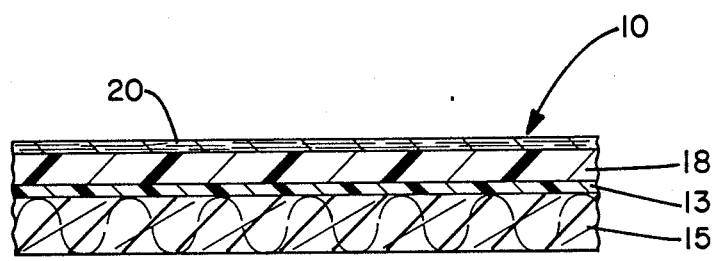

FLEXIBLE EPOXY-COATED FABRIC

FIELD OF THE INVENTION

The present invention relates to a fabric having a coating of a flexible epoxy resin to provide improved wear, ultraviolet light and hydrolytic resistance, and the like, with the resin generally having an intermediate hydrocarbon portion having from about 25 to about 40 carbon atoms per chain.

BACKGROUND ART

Heretofore, it has been known to use vinyl or urethane as a coating for fabric to impart improved durability to the fabric. However, it has not been known to use a flexible epoxy coating to impart the special characteristics of wear resistance, hydrolytic resistance, and ultraviolet resistance. The use of a flexible coating which does not impregnate the fabric results in a material having a pleasant "hand" or feel.

U.S. Pat. No. 3,591,400 to Palmquist et al, relates to a heat reflective fabric made by application of a transfer sheet which comprises an epoxy containing resin supporting reflective flakes to a base fabric.

U.S. Pat. No. 3,184,332 to Rachinsky relates to textile fabrics having from 0.5 percent to 5.0 percent of an epoxy-ester saturant.

U.S. Pat. No. 3,934,067 to Goldman et al, relates to a laminate having a woven or bonded fabric skeleton which is impregnated with a polymer resin, such as an epoxy-polyester resin.

U.S. Pat. No. 4,623,574 to Harpell et al, relates to a ballistic resistant article comprising a network of fibers coated with an elastomeric matrix.

U.S. Pat. No. 4,219,598 to Noma et al relates to an ornamental molded article comprised of a non-woven fabric with a multicolored pattern located between two synthetic resinous layers. A rigid matrix is formed.

U.S. Pat. No. 4,310,593 to Gross relates to water absorbent articles made from carboxylic polyelectrolytes which are cured with an amine-epihalohydrin adduct.

U.S. Pat. No. 4,329,387 to Goodrich et al relates to a prepreg fabric material having increased surface tack wherein the fabric can be graphite filaments.

U.S. Pat. No. 4,537,834 to Achar et al, relates to metal salts that are used as curing agents for epoxides which can be used as binders in graphite cloth laminates.

SUMMARY OF THE INVENTION

It is therefore an aspect of the present invention to coat a fabric with a flexible epoxy material. The fabric generally falls into one of three classes, that is a woven fabric having warp and weft threads, non-woven fabrics such as mats in which the fibers are randomly placed, and knits in which the fabric can stretch a relatively large amount. Generally any synthetic or natural fiber or combinations thereof can be utilized such as polyester, nylon, acrylic, polypropylene, cotton, wool fibers, and the like. An optional but desirable binder coating is defined as at least 50 percent by weight of a flexible material residing on the surface of the fabric as distinguished from a layer which saturates or impregates the interstices of the fabric. A flexible epoxy coats the binder and is generally a compound which has a long intermediate hydrocarbon chain portion such as from about 25 to about 45 carbon atoms per chain. The epoxy coating can have an embossed grain silicone release sheet thereon so that upon cure of the epoxy and removal of the release sheet, a grained surface is presented. A binder layer adheres the epoxy to the fabric. The epoxy-coated fabrics of the present invention can be used as an alternative to vinyl-coated fabrics as well as urethane-coated fabrics and have good abrasion resistance, chemical resistance, good hydrolytic stability, and the like, and do not require the use of plasticizers therein.

BRIEF DESCRIPTION OF THE DRAWINGS

FIG. 1 is a cross-sectional view of the invention illustrating a lamina containing a fabric support having a binder layer thereon, a flexible epoxy coating the binder layer, and a release sheet.

DETAILED DESCRIPTION OF THE INVENTION

Referring to FIG. 1, a flexible epoxy coated fabric lamina according to the present invention is generally indicated by the numeral 10. The bottom side of a flexible epoxy coating 18 is laminated to the top side of an optional but desirable binder layer 13 which in turn is laminated to a fabric support 15. A release sheet 20 is generally placed over the coating 18 such that it contacts the top side of the same. Often the release sheet has a grain surface thereon and imparts the same to epoxy coating layer 18.

The fabric can generally be any type of fabric. Fabrics fall into three general classes: (1) a woven fabric which is a fabric having warp and weft threads, (2) non-woven fabrics such as mats or felts in which the fibers are randomly laid down, and (3) knits in which the fibers are arranged generally in a sinusoidal weave bound at its upper and lower peaks. The fibers which comprise the fabric can be either natural or synthetic fibers or combinations of the same. Examples of suitable fibers include cotton and wool; regenerated cellulose, such as cellulose fibers formed from a solution such as viscose rayon, cuprammoniom rayon, deacetylated cellulose acetate, polyester fibers; polyamide fibers such as nylon; polyimide fibers; acrylic fibers, polypropylene fibers, polyvinyl chloride fibers, and the like. It should be noted that any natural or man-made fiber can be employed so long as it is compatible with the binder coating 13.

The epoxy resins which are utilized are flexible epoxies. An appropriate method of determining flexibility is measurement of apparent bending modulus by means of a cantilever beam, ASTM designation D747-86. This standard test method is incorporated herein by reference as if fully set forth herein. Suitable flexibility ranges for the epoxy coating of the present invention are from about 20 psi to about 2,000 psi, desirably from about 30 psi to about 200 psi, with about 80 psi to about 90 psi being preferred.

Epoxy resins which meet the above criteria generally have the following formula I:

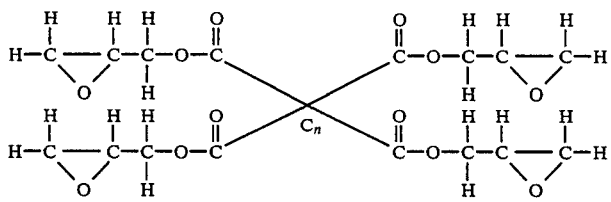

where n, independently, is a whole number from about 25 to about 45 and preferably from about 30 to about 40 for each of the chains. A preferred example of such a resin has an intermediate hydrocarbon chain where n is 34 for each chain and is sold by the Shell Chemical Company under the trademark EPON 871. The flexible epoxy resin is applied to the fabric in an amount of about 1 to about 50 ounces per square yard and preferably about 1 to about 15 ounces per square yard and most preferably about 2 to about 6 ounces per square yard measured in dry weight of epoxy.

Small amounts of a rigid epoxy resin can be blended with the flexible epoxy resins, such as up to 10 percent by weight. It is preferable, however, that the resin is exclusively a flexible resin. Additives known to those skilled in the art can also be added. Such fillers usually include calcium carbonate, clays and titanium dioxide used in conventional amounts. Leveling agents such as fumed silica can also be used.

The binder layer or resin is optional but is desirably utilized as an intermediate between the fabric and the flexible epoxy coating to bind or bond the same together. This layer is generally flexible, thin, and is a thermoplastic such as a polyurethane, a soft acrylic resin, a polyvinyl chloride resin, and the like. The binder layer can also be a flexible epoxy resin layer as described hereinabove. The flexible binder layer generally has an apparent bending modulus according to ASTM designation D747-86 of from about 20 psi to about 2,000 psi, desirably from about 30 psi to about 200 psi, with from about 80 psi to about 90 psi being preferred. In other words, the flexibility of the binder layer is generally the same as that of the above-noted flexible epoxy resin layer. Typically, the various polymers such as urethane are applied in a solution form as in a solvent, for example a lacquer, with the solvent then being allowed to evaporate. The binder is applied at a dry weight range of from about 0.5 to about 4.0 ounces per square yard and preferably from about 1.5 to about 2.5 ounces per square yard.

In order to maintain the proper hand and flexibility, the binder should not saturate or impregate the fabric. According to the concepts of the present invention, a coating is formed as in contrast to an impregnated fabric. By the term "coating" it is meant that at least 50 percent of the binder resides on the fabric surface, desirably at least 70 percent by weight. By the term "fabric surface" it is meant a plane passing tangentially through the top of fibers forming the matrix of the fabric. For a woven fabric for example, this plane passes tangentially through the top of the warp threads. Naturally, the amount of binder actually residing within the fabric will vary depending upon whether the weave is open or tight. However, the binder generally does not saturate or impregnate the fabric and thus results in a fabric having a suitable hand. When the binder is not utilized, the flexible epoxy layer resides directly upon the fabric. In such a lamina, the epoxy coats the fabric with at least 50 percent thereof, as noted above, residing on the fabric surface and desirably at least 70 percent thereof by weight.

A suitable process for the application of the epoxy coating to the fabric is as follows:

One or more coats of a flexible epoxy resin is applied to a silicone release sheet desirably having a grain design. This design will simulate the desired finish, such as a leather surface. The flexible epoxy layer is then heated to effect a partial or total cure. The binder layer is then applied to the bottom surface of the flexible epoxy resin layer. Subsequently, the fabric is pressed onto the binder layer. Heat is then applied to cure the binder layer and to cure the flexible epoxy if the same was only partially cured. The heat and time period of cure of the binder layer and the flexible epoxy layer will depend on the particular type of epoxy which can vary between 50° C. and 150° C. with the cure time being from 2 to about 10 minutes. After curing and cooling, the silicone release sheet is removed. The final product is a flexible fabric desirably having a grain design in the surface. As an alternative embodiment, the binder layer can be initially applied to the fabric and then the flexible epoxy coating can be applied thereto with or without the grained release sheet.

The resultant fabric has good wear resistance and inasmuch as plasticizers are not necessary, there is no migration or bleed-out of plasticizers. The resulting fabric has good hydrolytic and ultraviolet radiation resistance and resistance to microbic attack. It has a feel like dry leather and good hand. The fabric can be used as an alternative to vinyl and urethane-coated fabrics, such as apparel, safety clothing, automotive seating, upholstery and specialty items.

EXAMPLES

Coated flexible epoxy fabrics were prepared wherein the epoxy coating had a formulation as set forth in Table I. Each of the three Examples were prepared as follows: A silicone release paper was coated with a 4.0 ounce per square yard layer of a compounded epoxy formula as set forth in Table I. The epoxy was partially cured by heating to about 200° F. for a very short period of time. The partially cured epoxy coating was coated with a 2.0 ounce per square yard layer of a polyurethane binder made from a polyester intermediate. The composite was cured in an oven at 200° F. for three minutes and the release paper removed. The three epoxy-coated fabrics were then tested with regard to the apparent bending modulus and the results set forth in Table I.

TABLE I

| | A | B | C |
|---|---|---|---|
| Epon 871, manufactured by Shell Chemical Co. | 58 | 45 | 78 |
| Epon 828, manufactured by Shell Chemical Co. | 25 | 45 | — |
| Cab-O-Sil, manufactured | | | |

TABLE I-continued

|  | A | B | C |
|---|---|---|---|
| by Cabot Corporation | 2 | — | 2 |
| Harwick Pigment (30% in EPON 828) | 7 | 5 | — |
| Tetraethyltetramine | 7 | 6 | 9 |
| Iron Oxide Pigment (30% in EPON 871) | — | — | 4 |
| Aerosol, sodium dioctyl sulfosuccinate, a surfactant | — | 5 | 2 |
| Apparent Bending Modulus (ASTM D747-86) | 800–900 | 1800 | 85 |
| COMMENTS: | Somewhat Flexible | Fabric was Hard | A Flexible Fabric was Produced |

As apparent from the above Table, the present invention (C) yielded a dramatically reduced apparent bending modulus in comparison with the controls (A and B) which contained some flexible epoxy resin therein.

While in accordance with the Patent Statutes, the best mode and preferred embodiment have been set forth, the scope of the invention is not limited thereto, but rather by the scope of the attached claims.

What is claimed is:

1. An epoxy coated fabric, comprising:
   a fabric support coated with a flexible epoxy resin, said resin consisting essentially of an epoxy resin having an apparent bending modulus of from about 20 to about 2,000 psi as measured by ASTM D47-86 or an admixutre of said epoxy resin with up to 10% by weight of a rigid epoxy resin.

2. An epoxy coated fabric, comprising:
   a fabric support coated with a flexible epoxy resin, wherein said flexible epoxy resin is (1) derived from an epoxy having the formula

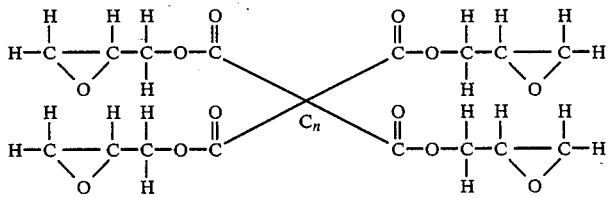

wherein n, independntly, is a whole number of at least about 25 for either of the chains or (2) an admixture of that epoxy resin with up to 10% weight of a rigid epoxy resin.

3. An epoxy coated fabric according to claim 2, wherein at least 50 percent by weight of said epoxy resin resides on the surface of said fabric support.

4. An epoxy coated fabric according to claim 3, wherein the amount of said flexible epoxy is from about 1 ounce to about 50 ounces per square yard.

5. An epoxy coated fabric according to claim 4, wherein the amount of said flexible epoxy is from about 1 ounce to about 15 ounces per square yard.

6. An epoxy coated fabric according to claim 5, wherein said intermediate hydrocarbon portion of said flexible epoxy has from about 30 to about 40 carbon atoms.

7. An epoxy coated fabric according to claim 6, wherein the amount of said flexible epoxy is from about 2 to about 6 ounces per square yard.

8. An epoxy coated fabric as set forth in claim 2, wherein said epoxy coating has an apparent bending modulus according to ASTM D747-86 of from about 20 to about 20,000 psi.

9. An epoxy coated fabric according to claim 7, wherein said epoxy coating has an apparent bending modulus according to ASTM D747-86 of from about 30 to about 200 psi.

10. An epoxy coated fabric according to claim 9, wherein said fabric support is woven, wherein said fabric support is made from polyester fibers, and wherein said flexible epoxy resin contains up to 10 percent by weight of a rigid epoxy resin based upon the total weight of said rigid epoxy resin and said flexible epoxy resin.

11. An epoxy coated fabric according to claim 4, wherein said epoxy coating is applied to a grained release sheet, subsequently pressed onto said fabric support, heated to cure said epoxy and then said release sheet is removed to yield an epoxy coated fabric having a grain on the surface.

12. An epoxy coated fabric according to claim 6, wherein said epoxy coating is applied to a grained release sheet, subsequently pressed onto said fabric support, heated to cure said epoxy and then said release sheet is removed to yield an epoxy coated fabric having a grain on the surface.

13. A flexible epoxy coated lamina, comprising:
   a first discrete layer comprising a fabric;
   a second discrete layer comprising a flexible binder; and
   a third discrete layer comprising a flexible epoxy, said binder layer adhering said flexible epoxy layer to said fabric layer and said flexible epoxy resin is (1) derived from an epoxy having the formula.

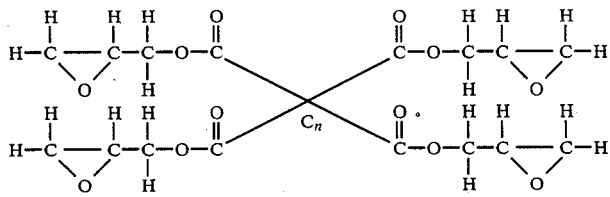

wherein n, independently, is a whole number of at least about 25 for at least one of said chains or (2) an admixture of that epoxy resin with up to 10% by weight of a rigid epoxy resin.

14. A flexible epoxy coated lamina, according to claim 12, and wherein said binder layer and said epoxy layer have an apparent bending modulus according to ASTM D747-86 of from about 20 to about 2,000 psi.

15. A flexible epoxy coated lamina, according to claim 14, wherein at least 50 percent by weight of said flexible binder resides on the surface of said fabric layer, and wherein said flexible epoxy layer and said flexible binder layer have an apparent bending modulus of from about 30 to about 200 psi.

16. A flexible epoxy coated lamina, according to claim 15, wherein the amount of said flexible epoxy is from about about 1 to about 50 ounces per square yard and wherein the amount of said binder is from about 0.5 to about 4.0 ounces per square yard.

17. A flexible epoxy coated lamina, according to claim 16, wherein said n of each epoxy chain independently is from about 30 to about 40, wherein the amount of said flexible epoxy is from about 1 to about 15 ounces per square yard, and wherein at least 70 percent by weight of said flexible epoxy resin resides on the surface of said fabric layer.

18. A flexible epoxy coated lamina, according to claim 17, wherein the amount of said flexible epoxy is from about 2 to about 6 ounces per square yard, wherein the amount of said flexible binder is from about 1.5 to about 2.5 ounces per square yard, wherein said binder is a polyurethane, an acrylic polymer, a polyvinyl chloride polymer, or combinations thereof, and wherein the apparent bending modulus of said flexible epoxy is from about 80 to about 90 psi.

19. A flexible epoxy coated lamina, according to claim 13, wherein said epoxy layer is applied to a grained release sheet, wherein said binder layer is subsequently applied to said flexible epoxy layer, wherein said fabric layer is subsequently applied to said binder layer, wherein said flexible epoxy layer is cured by heating the same, and wherein said release sheet is subsequently removed to yield said flexible epoxy coated lamina having a grain on said flexible epoxy surface.

20. A flexible epoxy coated lamina, according to claim 17, wherein said epoxy layer is applied to a grained release sheet, wherein said binder layer is subsequently applied to said flexible epoxy layer, wherein said fabric layer is subsequently applied to said binder layer, wherein said flexible epoxy layer is cured by heating the same, and wherein said release sheet is subsequently removed to yield said flexible epoxy coated lamina having a grain on said flexible epoxy surface.

21. A flexible epoxy coated lamina, according to claim 18, wherein said flexible epoxy resin contains up to 10 percent by weight of a rigid epoxy resin based upon the total weight of said rigid epoxy resin and said flexible epoxy resin.

* * * * *